May 26, 1953     J. T. FLAHERTY     2,639,751

COVER FOR VEHICLES

Filed Sept. 7, 1950

*INVENTOR.*

John T. Flaherty

Patented May 26, 1953

2,639,751

UNITED STATES PATENT OFFICE 2,639,751

COVER FOR VEHICLES

John T. Flaherty, White Plains, N. Y.

Application September 7, 1950, Serial No. 183,602

1 Claim. (Cl. 150—52)

This invention relates to a new and useful improvement in a cover for a vehicle.

An object of the invention is to provide a light strong cover for a vehicle to protect said vehicle from the elements and magnetic means for securing said cover to said vehicle.

Another object of the invention is to provide a cover and cover securing means which are useful to protect any equipment which is allowed to stand in the weather.

A further object of the invention is to provide a cover including a strip of magnetic material extending about the edge of the cover, the strip being spaced inwardly from the edge of the cover and secured to the cover, a row of spaced permanent magnets secured to the article to be covered, said row of magnets being spaced on the article to be covered so that said permanent magnets will cooperate with the strip of magnetic material to hold the cover in place.

A further object of the invention is to provide a cover including two strips of magnetic material extending about the edge of said cover, one strip being secured to one side of the cover and the other strip of magnetic material secured to the other side of the cover so that the cover can be secured in place with either side of the cover uppermost.

A further object of the invention is to provide a cover of the type described in which the row of spaced permanent magnets are secured to the cover, so that said magnets will be attracted to magnetic portions of an article to be covered or said permanent magnets will be attracted to magnetic strips secured to the article to be covered.

The above and additional objects are accomplished by such means as are shown in the accompanying drawings, described in the following description and more particularly pointed out in the claim.

Figure 1:
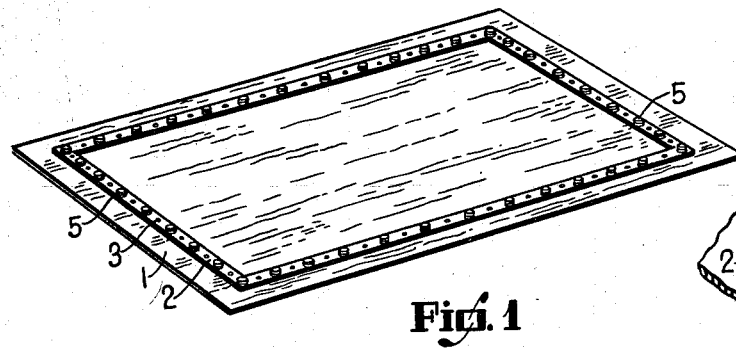
Fig. 1 is a perspective view of a vehicle cover.
Figure 2:
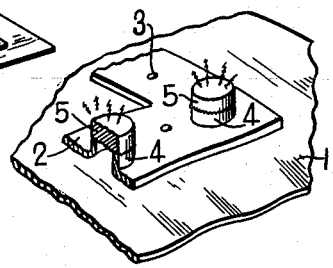
Fig. 2 is an enlarged view of a portion of the vehicle cover of Fig. 1.

Referring to Fig. 1 of the drawings, a vehicle cover is designated by the reference character 1. Vehicle cover 1 is made of light, strong, flexible material such as plastic or waterproof canvas. A strip of metal 2 extends around the edge of said cover. Strip 2 is spaced inwardly from the edge of the cover. Strip of metal 2 is secured to the cover in some suitable way. Fig. 2 shows rivets 3 securing strip of metal 2 to the cover 1. At spaced positions along metal strip 2 are struck up portions 4. Permanent magnets 5 are soldered to struck up portions 4. Of course permanent magnets 5 can be secured to metal strip 2 in other ways. In fact permanent magnets 5 can be secured to cover 1, directly, without any metal strip.

Figure 3:
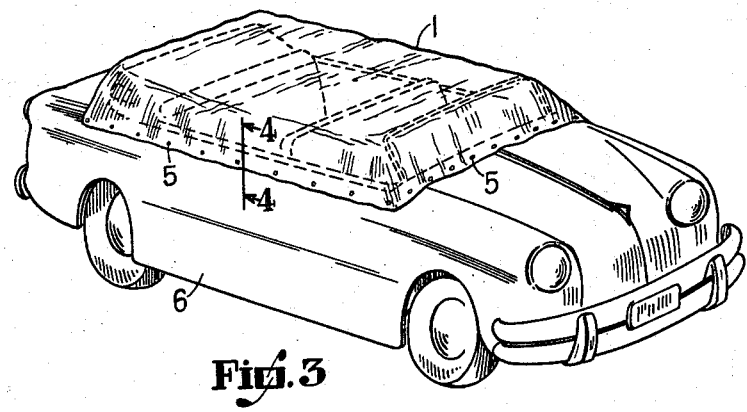
Fig. 3 is a perspective view of an automobile with one of my vehicle covers in place.
Figure 4:
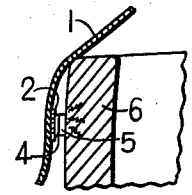
Fig. 4 is a sectional view on line 4—4 of Fig. 3.

Figs. 3 and 4 show a cover over the open top of an automobile 6. The cover is spread over the top of the automobile and the permanent magnets will be attracted to the body of the automobile, to hold the cover in place. The cover 1 can be large enough to cover the entire vehicle if desired.

Figure 5:
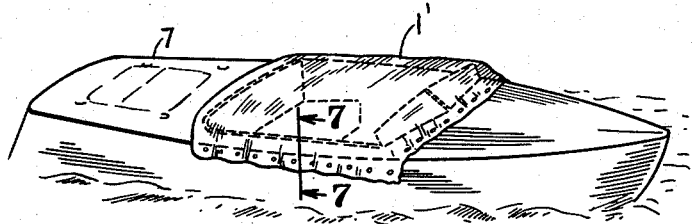
Fig. 5 is a perspective view of a boat with a vehicle cover in place.
Figure 7:
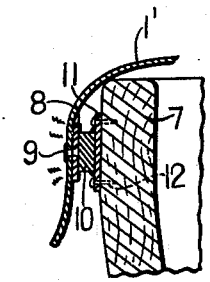
Fig. 7 is a sectional view on line 7—7 of Fig. 5.
Figure 6:
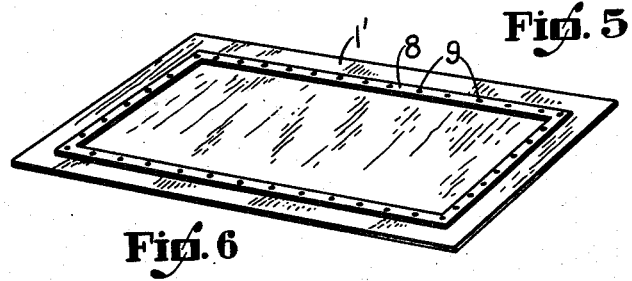
Fig. 6 is a perspective view of a modified form of vehicle cover.

Figs. 5, 6 and 7 show a cover for a vehicle which vehicle is not of magnetic material. In this case the vehicle is a boat 7 which may be of wood, aluminum or other nonmagnetic material. As shown in Fig. 6, cover 1' has a strip of magnetic metal 8 about the edge of cover 1'. Metal strip 8 is secured in place in any suitable way such as by rivets 9. A row of permanent magnets 10 is secured to the boat. The row of permanent magnets is positioned to cooperate with magnetic metal strip 8, to hold the cover in place. Permanent magnets 10 are secured to metal strip 11. Metal strip 11 may be of magnetic material. Metal strip 11 is secured to the boat by suitable securing means 12. Each permanent magnet 10 may have a separate metal strip 11 or a plurality of permanent magnets may be secured to a long metal strip. There may be a magnetic metal strip 8 secured to both sides of cover 1' so that cover 1' can be used with either side up. The cover may be of different sizes for different vehicles and the cover may be large enough to cover the entire vehicle.

The cover of my invention is not limited to use with vehicles. The cover can be used to cover any equipment which is permitted to stand in the weather.

In practice, I have found that the form of my invention illustrated in the drawings and described in the above description is the most efficient and practical. Various minor changes in details of construction, proportions and arrangement of the various parts may be resorted to without departing from the scope of my invention as set forth in the following claim.

I claim:

In combination, a vehicle body having an open passenger compartment with peripheral edges of non-magnetic material, a plurality of magnets and means for securing said magnets spaced from each other to the vehicle body adjacent said peripheral edges and on the outer face of the vehicle body, a flexible cover adapted to extend over the compartment, a continuous flexible magnetizable metallic strip fixed to the inner face of the cover and inwardly of its edges, whereby when the cover is extended over the compartment said strip is attracted by said magnets to hold the cover over said compartment.

JOHN T. FLAHERTY.

References Cited in the file of this patent

UNITED STATES PATENTS

| Number | Name | Date |
|---|---|---|
| 558,401 | Lobee | Apr. 14, 1896 |
| 590,340 | Sharples et al. | Sept. 21, 1897 |
| 1,069,219 | Batten | Aug. 5, 1913 |
| 1,198,227 | Hinchey | Sept. 12, 1916 |
| 1,257,206 | Fernbach | Feb. 19, 1918 |
| 1,728,437 | Mott | Sept. 17, 1929 |
| 2,119,072 | Cohen | May 31, 1938 |
| 2,212,326 | Piken | Aug. 20, 1940 |
| 2,279,812 | Bartlett | Apr. 14, 1942 |
| 2,319,292 | Boggs | May 18, 1943 |

FOREIGN PATENTS

| Number | Country | Date |
|---|---|---|
| 382,471 | Great Britain | Oct. 27, 1932 |
| 373,213 | Italy | July 21, 1939 |